US005701365A

United States Patent [19]
Harrington et al.

[11] Patent Number: 5,701,365
[45] Date of Patent: Dec. 23, 1997

[54] SUBPIXEL CHARACTER POSITIONING WITH ANTIALIASING WITH GREY MASKING TECHNIQUES

[75] Inventors: Steven J. Harrington; R. Victor Klassen, both of Webster, N.Y.

[73] Assignee: Xerox Corporation, Stamford, Conn.

[21] Appl. No.: 667,692

[22] Filed: Jun. 21, 1996

[51] Int. Cl.[6] .................... H04N 1/387; G06T 11/00
[52] U.S. Cl. .................... 382/212; 382/298; 382/299; 358/456
[58] Field of Search .................... 358/450, 454–459; 395/101, 109, 110, 131, 133, 141–143; 382/212, 213–214, 298–299

[56] References Cited

U.S. PATENT DOCUMENTS

| 5,185,852 | 2/1993 | Mayer | 395/101 |
|---|---|---|---|
| 5,261,030 | 11/1993 | Brooke | 395/133 |
| 5,333,249 | 7/1994 | Klassen | 395/143 |
| 5,379,129 | 1/1995 | Othmer et al. | 358/450 |
| 5,513,016 | 4/1996 | Inoue | 358/456 |
| 5,544,294 | 8/1996 | Cho et al. | 395/141 |
| 5,581,667 | 12/1996 | Bloomberg | 395/109 |
| 5,611,027 | 3/1997 | Edgar | 395/131 |

FOREIGN PATENT DOCUMENTS 9114995  10/1991  WIPO.

OTHER PUBLICATIONS

Foley et al, Computer Graphics Principles and Practice, pp. 72–91 (1990).
"The Aliasing Problem in Computer–Generated Shaded Images", Comm. ACM, vol. 20, No. 11, Nov. 1977, by F. Crow, pp. 799–805.
"A New Simple and Efficient Antialiasing with Subpixel Masks", Computer Graphics, vol. 25, No. 4, Jul. 1991, by A. Schilling.
"Compositing Digital Images", Porter et al., Siggrraph '84, Computer Graphics, vol. 18, No. 3, Jul. 1984, pp. 253–259.
Knuth, "Sorting and Searching," The Art of Computer Programming, vol. 3, pp. 145–149, Addison-Wesley Publishing Co., 1973.

Primary Examiner—Edward L. Coles, Sr.
Assistant Examiner—Stephen Brinich
Attorney, Agent, or Firm—Mark Costello

[57] ABSTRACT

A method for combining foreground objects defined by a mask value and shade value, with a background image defined by a shade value, using high resolution edge information derived from low resolution grey image representations. By treating the object edge pixels in a high resolution grey model, characteristics of an edge represented by an edge pixel can be approximated by reference to surrounding grey elements. Movement of the edge can be approximated by changing the mask values in the high resolution grey model. Changes in the overall grey level of the pixel resulting from the mask changes cause the impression of edge movement in the low resolution edge.

22 Claims, 8 Drawing Sheets

| A | $\dfrac{A+B}{2}$ | B | $\dfrac{B+C}{2}$ | C |
|---|---|---|---|---|
| $\dfrac{A+D}{2}$ | $\dfrac{A+B+D+X}{4}$ | $\dfrac{B+X}{2}$ | $\dfrac{B+C+E+X}{4}$ | $\dfrac{C+E}{2}$ |
| D | $\dfrac{D+X}{2}$ | X | $\dfrac{E+X}{2}$ | E |
| $\dfrac{D+F}{2}$ | $\dfrac{D+F+G+X}{4}$ | $\dfrac{G+X}{2}$ | $\dfrac{F+G+H+X}{4}$ | $\dfrac{F+H}{2}$ |
| F | $\dfrac{F+G}{2}$ | G | $\dfrac{G+H}{2}$ | H |

*FIG. 6*

SUBPIXEL CHARACTER POSITIONING WITH ANTIALIASING WITH GREY MASKING TECHNIQUES

This invention relates to a method of antialiasing edges of translated objects, utilizing gray masking techniques. This method can be employed to combine foreground and background images.

CROSS REFERENCE

Cross reference is made to copending United States patent application Ser. No. 08/353,763, filed Dec. 12, 1994, and entitled "Antialiasing With Grey Masking Techniques", by Harrington et al.

BACKGROUND OF THE INVENTION

Some printers and displays are capable of reproducing multiple levels of grey, as compared to the common printers that print only black or non-black. Such grey level printers include those using dye diffusion, direct electrostatic printing, certain grey printing ink jet devices, and the hyperacuity printers described, for example, in U.S. application Ser. No. 08/145,009, titled "Interlace Formatting in a Hyperacuity Printer". Additionally, printers that take in continuous tone input, even if those printers then halftone the input, are considered continuous tone, particularly if the halftoning occurs at a resolution higher than the image input resolution. Such printers operate to directly reproduce continuous tone images, as compared, for example, to binary printers that operate to print black and white, and require halftoned input to produce images that appear grey when viewed at normal distances. Grey printers may also be capable of reproducing continuous tone polychromatic images, when provided with the appropriate marking materials, and arrangements that allow the superposition of different marking material separations. Here, we refer to grey printers as the class of printers that print more than about 2 levels of grey, and preferably in the range from 16 to 256 levels of grey.

The process of constructing a raster image takes as input a series of input primitives (such as characters, polygons, and scanned images) which are drawn sequentially onto an existing background image (which conceptually, at least, may be considered to be an array of pixels or image signals, each of which contains the current background color). The background image begins blank, and when all of the input primitives in the series have been drawn, it contains the desired raster image. The raster image may then be displayed or transmitted to a raster output printer. The input primitives each have associated with them a color and a shape. One way of describing the primitives is to consider the shape to be a mask or stencil, and the color as an ink which is put through the mask. The mask is commonly represented digitally, with a zero value representing opaque (impermeable) and a one value representing transparent (permeable). As an input primitive (the foreground image) is combined with the background image, for each pixel in which the mask value is 1, the corresponding pixel in the background image has its value replaced with that of the ink (the foreground color).

In almost any digital printing method, the shapes of graphical objects and text are dictated by binary masks. Each pixel forming an object is either a part of the object, or it is not. Thus, representations of edges that are not exactly aligned with fast scan or slow scan processing directions of a printing device are characterized by sharp, jagged or sawtoothed edges (aliased edges) reflecting the attempt to approximate the edge on pixel boundaries, as illustrated in FIG. 1. See, for example Foley et al, Computer Graphics Principles and Practice, pp. 72–91 (1990), which discusses how such lines are created. One desirable aspect of this construction is that it enables edges to butt together when two objects are placed side-by-side, enabling the formation of complex images. However, when exposed, aliased edges are often deemed unattractive, and detracting from image quality. Aliasing, therefore, refers to the introduction of low frequency components of the (sampled) image that would not be present in an ideal (not sampled) image, but which occur in the actual image as an artifact of the sampling rate. Frequencies above half the sampling rate in the ideal image appear 'aliased' as frequencies below the sampling rate.

One approach to resolving this problem is to increase resolution so that the jagged edges become finer and are better integrated by the eye. However, increasing resolution is costly in any reproduction device.

Another well known process in the graphics arts community for alleviating the aliasing problems on CRT displays is referred to as "antialiasing". Antialiasing techniques attempt to remove higher frequencies appearing in the image or to limit them to cases that are likely to match the ideal image. This process entails placing grey pixels at object edges to soften the transition between foreground and background, as illustrated in FIG. 2. Typically each edge pixel is given a grey value that is a weighted average of the foreground and background levels, with the weights depending on the location of the edge of the idealized object passing through it. See, for example, "The Aliasing Problem in Computer-Generated Shaded Images", Comm. ACM, Vol. 20, No. 11, November 1977, by F. Crow, pp. 799–805; "A New Simple and Efficient Antialiasing with Subpixel Masks", Computer Graphics, Vol. 25, No. 4, Jul. 1991, by A. Schilling; also, WO91/14995 A1 to Wells et al., entitled "Method and Apparatus for Rendering Anti-Aliased Polygons". Also note U.S. Pat No. 5,333,249 to Klassen, entitled, "Method for Phase Aligned Nth Bitting for Graphics Applications".

Applying antialiasing to the ink/mask model, the mask is no longer binary: values between 0 and 1 are used along the edges to represent partial coverage of a pixel by the mask. Typically, as a new primitive is drawn into the background image, a weighted average of the ink with the background value is used as the new background value. Specifically, the value of the mask is multiplied by the ink value, while one minus the value of the mask is multiplied by the background value, and the two are summed to give the new background value. For example, in the interior of an object, the mask value is 1, and so the ink color is used on its own, while in the exterior, the value is 0, so the background remains unchanged. For a pixel on the edge, if the mask half covers the pixel, the pixel and background will be equally weighted. This approach is known in the art as alpha-blending, (where alpha is the opacity or mask value). See, for example, WO91/14995 A1 to Wells et al., and "Compositing Digital Images", Porter et al., SIGGRRAPH '84, Computer Graphics, Vol. 18, No. 3, July 1984, pp. 253–259.

The technique can also be applied to text to improve its quality, as illustrated in FIGS. 3A and 3B. However, antialiased characters can only be positioned on the display device grid. For a typical CRT this would mean that character placement is quantized to 1/72". This results in characters appearing unevenly spaced (some character pairs too close and some too far apart in words). It is possible to construct an antialiased instance of a character at any position (i.e., a much finer spacing than the display grid), but this requires a distinct version of the character for every position. It would mean storing a copy for each desired position, which may require too much memory, especially if fine positioning is needed. Alternatively, one could use commonly known techniques of raster translation, but this results in unnecessarily blurring the character.

In U.S. patent application Ser. No. 08/353,763, filed Dec. 12, 1994, and entitled "Antialiasing with Grey Masking Techniques", by Harrington et al., an antialiasing method was proposed to determine antialiased gray pixel values, for print or display at a gray level reproduction device, wherein pixels have shade values determined as a function of their neighbors' shade values and mask values. Such values are determined by processing each pixel in terms of subpixels forming the pixel. Each of a plurality of subpixel areas is assigned mask and shade values as a function of its position in the pixel and with respect to the nearest neighbors. The resulting values for each subpixel are averaged to determine a final output value for the pixel.

As used herein, translate and translation refer to spatial positioning or movement.

References disclosed herein are incorporated by reference for their teachings.

SUMMARY OF THE INVENTION

The present invention is directed to a method of translating or transforming antialiased masks.

In accordance with one aspect of the present invention, there is provided an improved method for combining foreground objects defined by a mask value and shade value, using high resolution edge information derived from low resolution grey image representations. By treating the object edge pixels in a high resolution grey model, characteristics of the edge represented by an edge pixel can be approximated by reference to surrounding grey elements. Edge movement can be approximated by changing the mask values in the high resolution grey model. Changes in the overall grey level of the pixel resulting from the mask changes cause the impression of edge movement in the low resolution edge.

In accordance with another aspect of the invention, there is provided an improved method for combining an existing image A, and a grey mask M for a character to be added to image A, and a shade value and location for the character, including the steps of: 1) expanding gray mask M to a bitmap m; 2) translating or moving m with respect to image A by some number of subpixels; 3) finding pixels in image A overlapped by the translation of m; and 4) expanding those pixels found in A To a bytemap B; 5) replacing any subpixels of the expanded pixels corresponding to a pixel in m with the current shade value, and 6) filtering those pixels in B and returning the filtered pixels to A. Grey mask M can be expanded into bitmap m all at once or as each pixel is needed.

As an alternative, the process may take the form of: 1) expanding gray mask M to a bitmap m; 2) translating or moving m with respect to image A by some number of subpixels; 3) averaging the gray mask to yield a new antialiased mask at the translated location; 4) finding pixels in image A overlapped by the translation of m; 5) alpha blending the expanded value set to determine the new antialiased mask.

In accordance with another aspect of the invention, there is provided a method of processing an antialiased mask, for improved edge rendition, the method comprising: a) receiving mask values with an antialiased edge, for a pixel of interest and a plurality of neighboring pixels thereto in the mask; b) subdividing the pixel of interest into a predetermined number of subpixels; c) determining from the mask data for the pixel of interest a number p of subpixels that should be permeable; d) determining a permeability value for each subpixel as a function of the mask value of the pixel of interest, the mask value of at least one neighbor and the relative position of the subpixel in the pixel of interest and the at least one neighbor; e) sorting the determined permeability values by magnitude, and identifying subpixels having the p largest magnitudes as permeable; f) realigning the mask defining the object boundaries among the subpixels forming the pixel of interest; and g) averaging the mask values of all the subpixels to obtain the antialiased value of the pixel.

This invention provides a solution to the problem of antialiased edges. The gradations of grey at edges change the apparent position of the edge at normal viewing conditions. By carefully selecting the grey level of the pixels at an edge, the apparent position of the edge is made to move. The present invention therefore provides a way to shift or translate an antialiased edge by subpixel amounts, without blurring it further than is already done for antialiasing. For character processing, a single instance of each character can be stored and shifted as needed for finer positioning.

A more complete understanding of the present invention can be obtained by considering the following detailed description in conjunction with the accompanying drawings in which.

Figure 1:
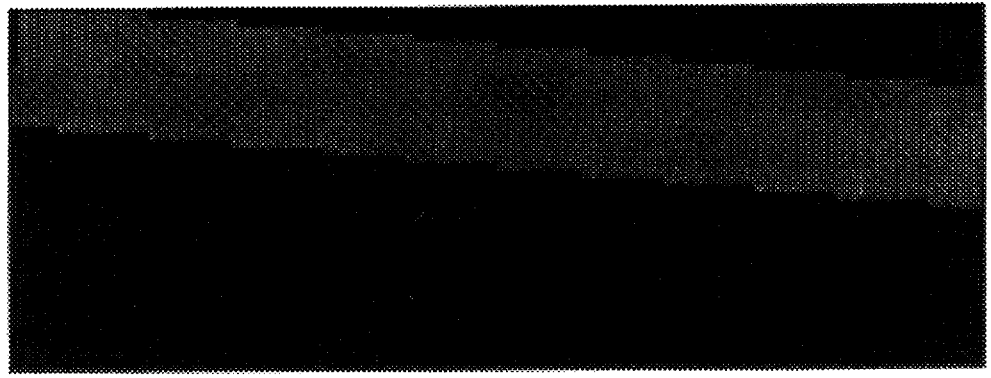
FIG. 1 illustrates the problem of aliasing or jaggies.
Figure 2:
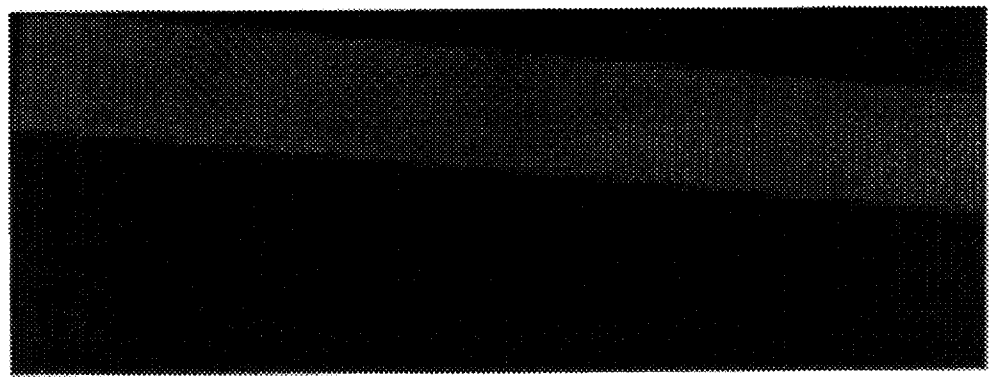
FIG. 2 illustrates antialiasing using grey pixels at object boundaries.
Figure 3A:
FIGS. 3A and 3B illustrate the appearance of a foreground object edge to be combined with a background.
Figure 3B:
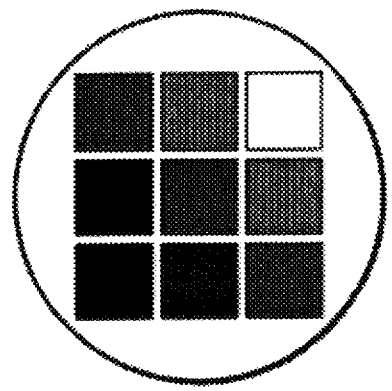
Figure 4:
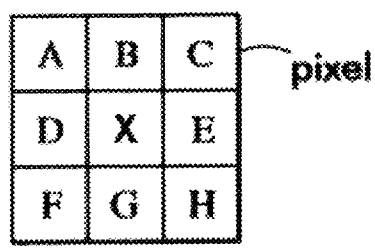
Figure 5:
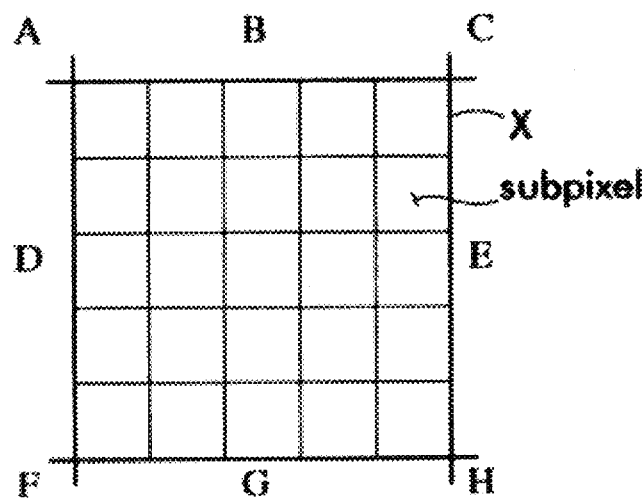
Figure 7A:
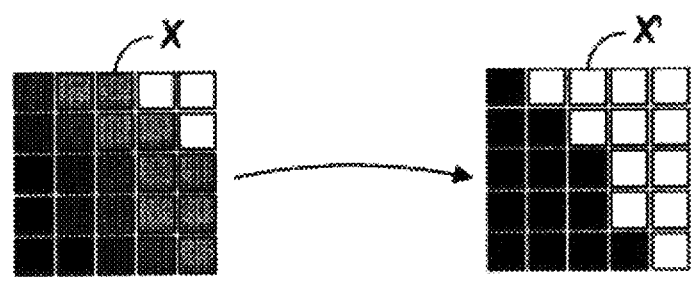
Figure 7B:
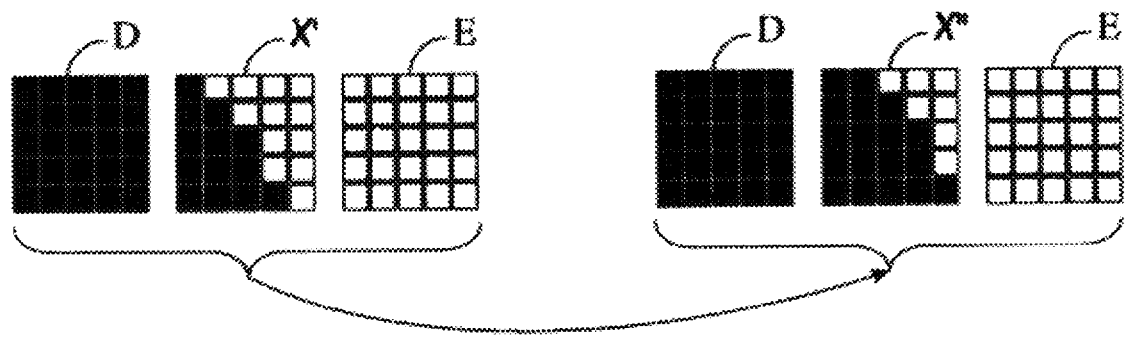
Figure 7C:
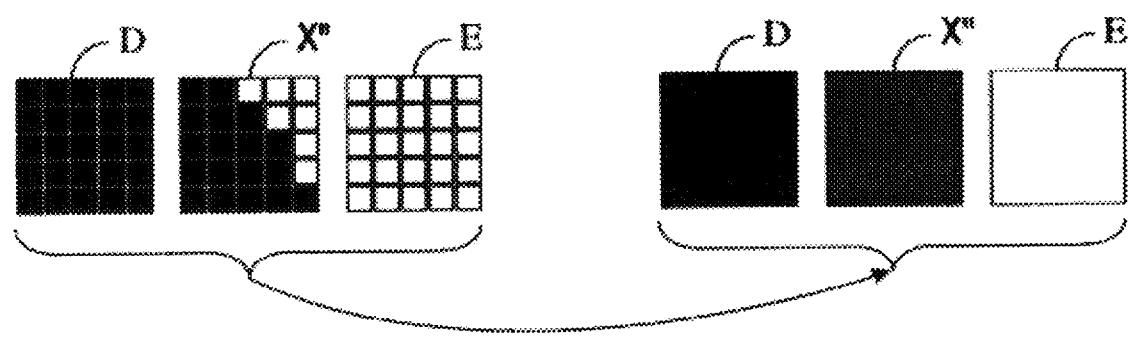
Figure 8:
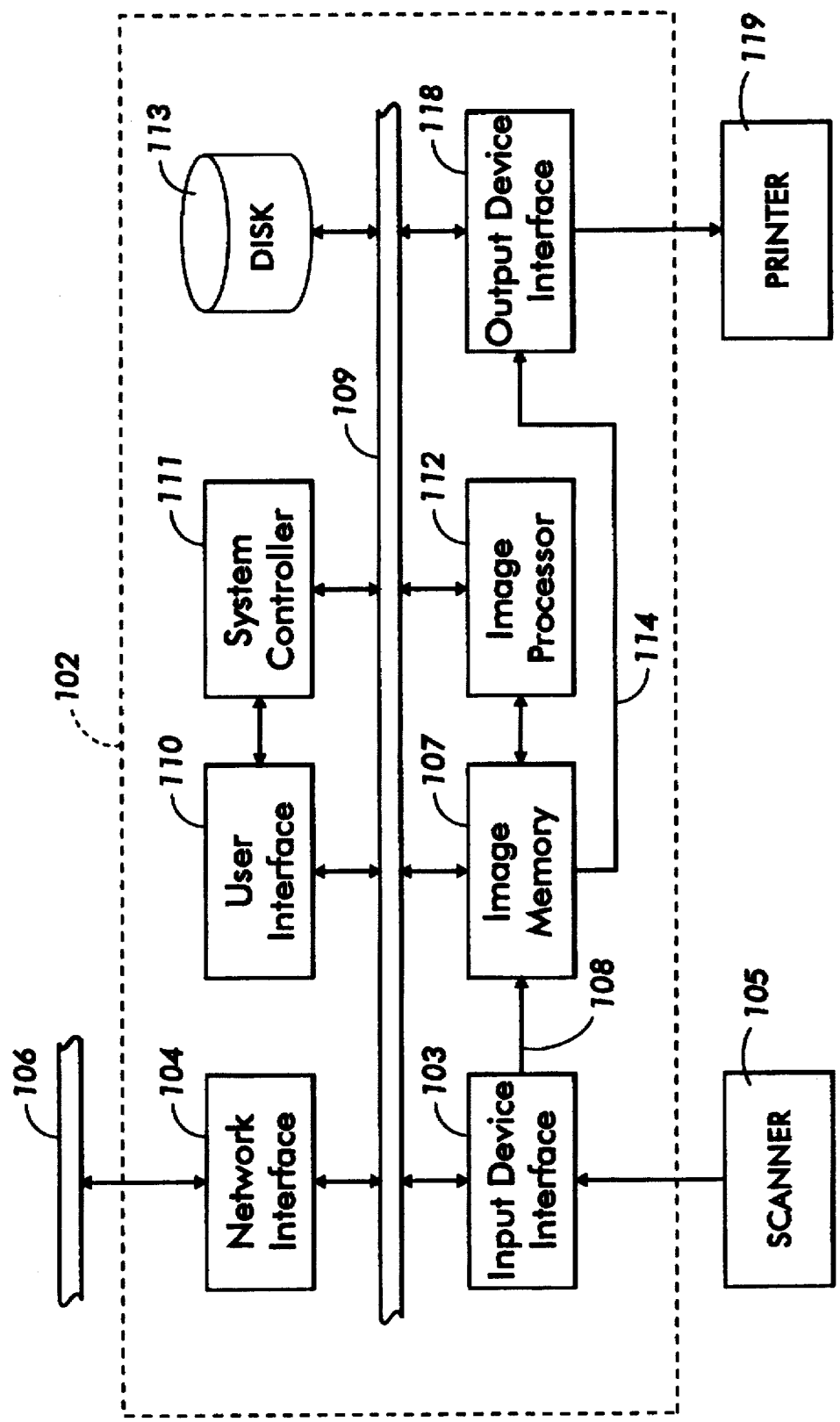
Figure 9:
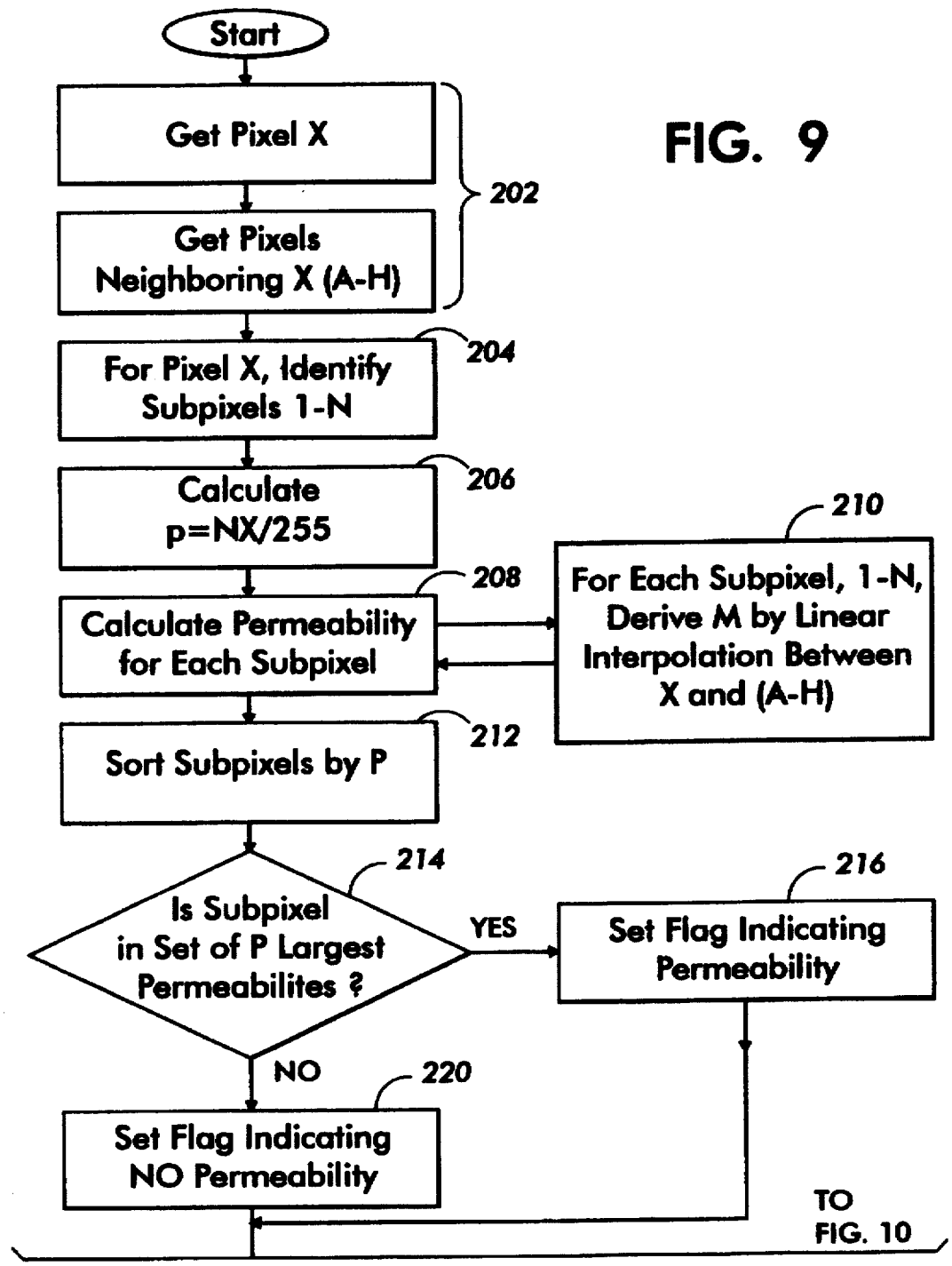
Figure 10:
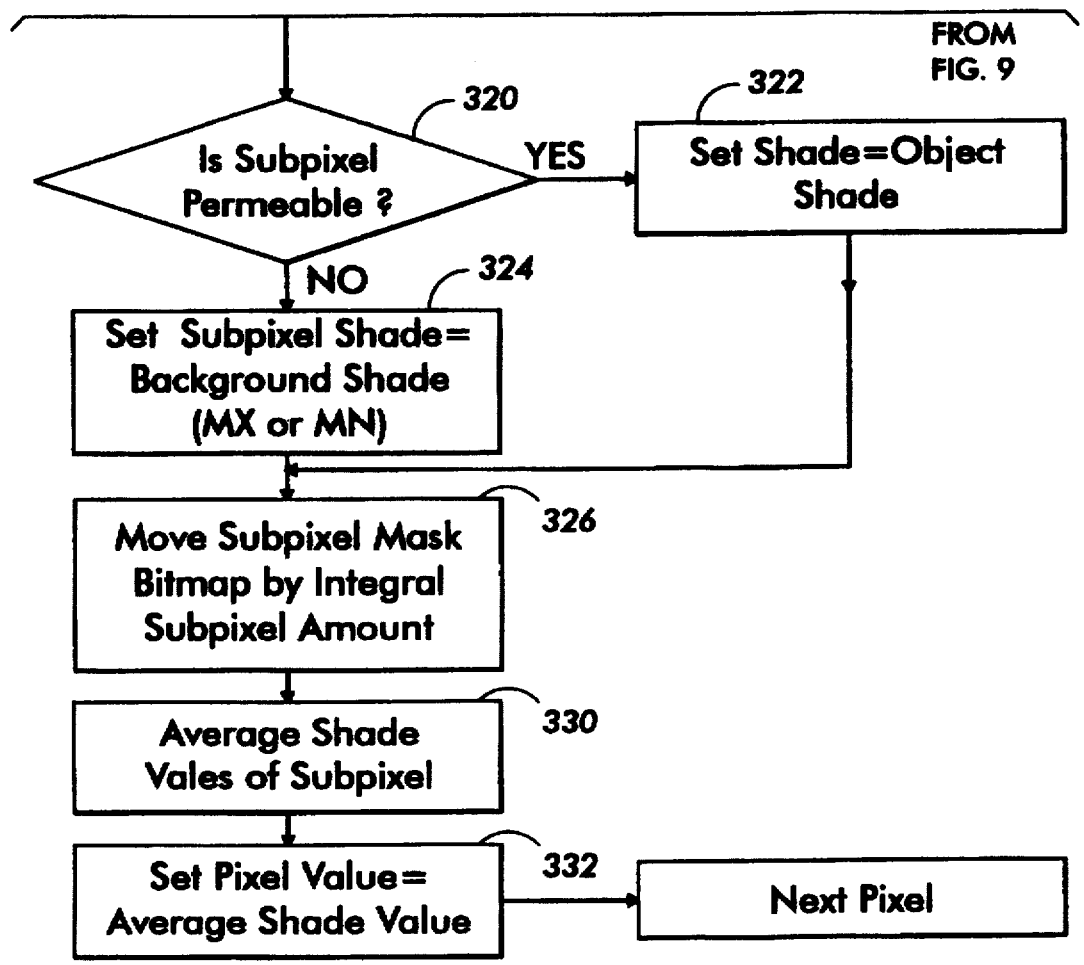

FIGS. 4, 5, and 6 together illustrate the principle of U.S. patent application Ser. No. 08/353,763, filed Dec. 12, 1994, and entitled "Antialiasing with Grey Masking Techniques", by Harrington et al., which uses surrounding pixel information to derive the mask value for each pixel;

FIGS. 7A, 7B, and 7C together illustrate the subpixel positioning of edges in accordance with the invention;

FIG. 8 represents an exemplary system in which the present invention may find use;

FIGS. 9 and 10 illustrate a flow chart of the inventive process; and

Figure 11:
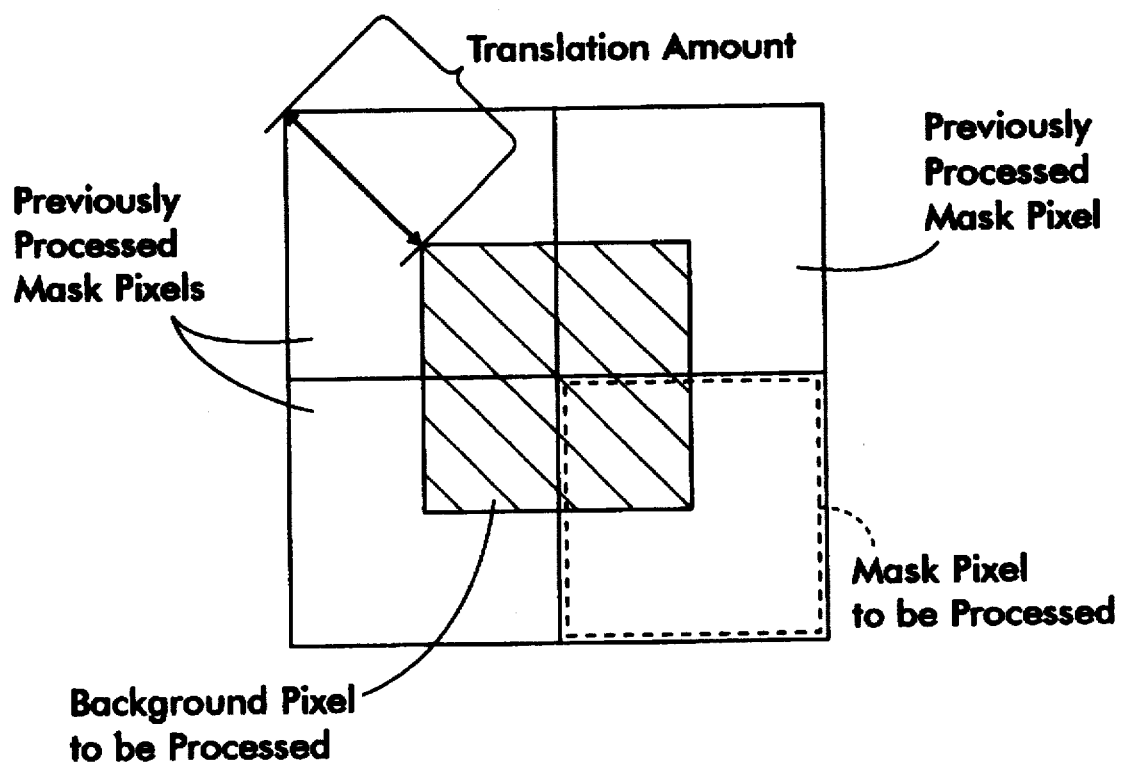

FIG. 11 illustrates the subpixel replacement process.

DESCRIPTION OF THE PREFERRED EMBODIMENT

With reference now to the drawings, where the showings are for the purpose of illustrating an embodiment of the invention and not for limiting same, FIGS. 4–7 illustrate the principle of the present invention. In accordance with the present invention, estimates of the regions of the pixel covered by the new object and each of the background shades are combined to give a current value of each pixel. This is done by taking the current pixel and its eight immediate neighbors as a model for the behavior of the image within the pixel. FIG. 4 illustrates pixel X and its immediate neighbors A–H. While the present invention is described with references to immediate neighbors, extensions of the invention might use an increased or decreased number of neighbors. A "pixel" refers to an image signal associated with a particular position in an image, having a shade between white and black. Accordingly, pixels are defined by intensity (or density) and position. "Grey", as used herein does not refer to a color unless specifically identified as such. Rather, the term refers to image signals that vary between maximum and minimum, irrespective of the color of any separation in which the image signals are used. As used herein, images are ordered collections of image signals acquired by scanning an original document with a document scanner, an electronic camera or the like; or by a computer operated in accordance with a computer graphics generation program; or obtained from a memory without reference to the original source.

As used herein, "foreground" refers to the new object being added to an image during the construction of a final image. "Background" refers to the existing image's state at the point before a new foreground object is added. The background may include objects added to the image prior to the current object of interest. As the term will be used herein, "shade" refers to the color or intensity of objects such as the foreground object of interest, on objects in the background. As used herein, "mask" refers to a description of an object's shape. To describe an object one must indicate both its shape and its color (i.e., its mask and shade). One can think of the process of adding an object to an image as painting ink through a stencil onto a background image. The stencil provides the shape and acts as the mask. The ink provides the shade. The shape defining stencil has areas that are open and permit the ink to pass, and other areas where the flow of ink is blocked. In accordance with this analogy, regions where the foreground shade is permitted to replace the background are referred to as permeable. Areas where the background remains correspond to regions of the mask that are not permeable.

Image information received may be in a number of formats. In the class of images received via a PDL description, the images are described in resolution independent terms and accordingly can be decomposed into an image element of any arbitrary or useful resolution. Images may be received already prepared for rendering at a given printer, at the printer resolution. Image elements to be combined may also be received at multiple resolutions, requiring conversion as required to a common resolution.

Considering initially a PDL-described image, as it is initially decomposed into a bitmap, a foreground object will have a shade value i and mask value M at each pixel forming the object, in order to blend shade and background. A mask value represents how much of a pixel is covered by the object. It should be clear that in some locations in the image, no blending occurs, and the value of the pixel is either the object shade, or the background shade. At other locations however, the mask value represents the partial covering of the pixels by the object or the background. The problem is to estimate the shape of the object within the pixel boundaries from the mask value of the pixel and the mask values of the neighboring pixels. The shape of the object within the pixel is defined in terms of an increased or hyper-resolution grid of regions or subpixels within the pixel.

With reference now to FIG. 5, pixel X is divided into S subregions or subpixels. In one embodiment, shown in our example, S=25 has been selected as a convenient number of subpixels for calculation purposes, with smaller or larger numbers, greater than 1, not precluded. A smaller number of subpixels may not accurately characterize changes in the mask over the pixel area, while a larger number will increase processing time. The subpixels have also been illustrated for convenience as corresponding to equal sized regions. This is not necessarily the case.

To be determined are which subpixels should be permeable and which should be opaque. Under the assumption that a sharp edge is being represented by the mask, subpixels are either made totally opaque or totally permeable. The fraction of the subpixels that are permeable should match the value M of the mask of this pixel. Stated another way, in an 8 bit system, where the number of possible display or printing levels N is equal to 256 (including 0), if mask value M is given as $$0 \leq M \leq 255$$

and the number of subpixels is S then the number p of permeable subpixels would be given as $$p = {}^{MS}/_N$$

A fractional permeability parameter P of each subpixel is determined by interpolating mask values of neighboring pixels (for example using linear interpolation), which for the example pixel and its neighbors shown in FIGS. 4 and 5, are given in FIG. 6. Then, the p subpixels with the highest fractional permeability values P are selected. It will be appreciated that what is important is that subpixel mask values be derived that reflect relative relationships of the mask values of pixel X and pixels neighboring pixel X. There are many potential functions that describe such relationships and could be substituted for the linear interpolation function described and illustrated here.

Looking to the array of FIG. 6, the most permeable subpixels are available by the logical function of sorting. Sorting techniques are well known and many methods can be used; the heapsort technique (See, e.g., Knuth, "Sorting and Searching," The Art of Computer Programming, Vol. 3, pp. 145–149, Addison-Wesley Publishing Co., 1973.) is, however, particularly well suited because it computes each next largest value as needed. This means it minimizes the required computation when only a partial sorted list is required. In this case only the p largest values (or S-p smallest values) are needed, and sorting computation can cease once they have been identified. The function heapsort can sort the subpixels and select those subpixels with the largest permeability values. One need not perform a full sorting of all subpixels, but at most half of them, since either p or S-p regions will do (at most 12 for the 5×5 case). If p is greater than half the subpixels, one can use of the heapsort function to discover the (S-p) smaller values regions, and then determine the complement to get the largest valued regions. This means that the sort can always be terminated less than halfway through the list of entries.

With reference now to FIG. 7A, the pixel X can be modeled as having only two shades, shown as X', with the mask value being either permeable or opaque, and with each subpixel having a value indicating such a condition, the equivalent of a binary system. At FIG. 7B, the mask can be moved, by increments of the selected subpixel resolution. Once the high resolution binary mask has been derived for the pixel and its neighbors (here denoted as D and E), the mask can be realigned with the display grid according to the desired translation, thus deriving new pixel X". Accordingly, at FIG. 7C, the middle pixel X" now represents a new edge between the two distinctly colored pixels. Of course, the mask values can be moved in any direction or combination of directions.

With the realigned subpixel mask values determined, the final step is to average the values for all of the subpixels of the pixel. The resulting average value is the new mask value for the pixel of interest.

The above analysis is rather complex to be carried out efficiently on a per pixel basis. Fortunately, the most common cases do not require this degree of processing. Often one can calculate and cache the shifted mask for the translated object (e.g., a character mask). One can determine the subpixel mask for the object, translate that mask and reduce it to an antialiased normal resolution mask for combination with the background. For objects such as characters this processing can be done once and the translated mask saved for use in multiple instances of the characters placement in the image. If the mask value after translation is 0 (a minimum value in an 8 bit system indicating impermeability), then the pixel shade is set to the background value $X_b$, that is, the pixel value is unchanged. If the mask value after translation is 255 (a maximum value in an 8 bit system indicating permeability) then the result is set to the foreground object shade i. If the background value is white or black (255 or 0) or if the maximum value matches the minimum value (MX=MN), then the background is considered uniform and the alpha blending formula, given as $$(X_M i + (N - X_M) X b) / N$$

can be used as the resulting pixel value.

If the background values are not uniform, then a method such as described in U.S. patent application Ser. No. 08/353,763, filed Dec. 12, 1994, by Harrington et al., and incorporated herein by reference, can be used to combine background and foreground. This method also employs the construction of a high resolution model for the mask as well as a model for the background, computation can be made more efficient by using the high resolution mask constructed by the method described herein for object translation, as the mask employed when the object is integrated with the background.

Referring now to FIG. 8, a basic document processing system is shown including a document processing system 102. The image processing system 112 receives image information either through input device interface 103 or network interface 104. In this embodiment, input device interface 103 is connected to scanner 105 which generates images I(x,y,d) having a defined width x, length y and number of density levels d. Common scanners, such, for example, the Pixelcraft 7650, produce 8 bit/pixel data, providing d=256, at resolutions acceptable for many purposes. Color images may be defined by a plurality of bitmaps. Alternatively, image information received through network interface 104 from network 106 can be transmitted from devices such as remote scanners, file servers or page description language (PDL) drivers (not shown). Information received through network interface 104 may contain in part or in full image information in the form of raster images having a defined width, length and depth.

Once a raster image is received from scanner 105 by document processing system 102, image I(x,y,d) is transmitted to image memory 107 either through connection 108 or data bus 109 as directed by system controller 111. In the event image information is simultaneously received through interfaces 103 and 104, controller 111 routes image information from network 6 to secondary storage or hard disk 113 through data bus 109 and image information from input device or scanner 105 to primary storage or image memory 107 using connection 108. Once image information such as image I(x,y,d) is received and stored in memory 107, image processor 112 is invoked by controller 111 as programmed through user interface 110 which operates on a video display or the like. Subsequent to processing image I(x,y,d) resulting in antialiased image information, the image stored in memory 107 is either reproduced on output device or printer 119 through connection 114 and output device interface 118 or transmitted to secondary storage 113 or a remote device connected to network 106 through data bus 109. It will be noted that the present invention applies primarily to the case of the combination of images, e.g., when shapes defined by a PDL file overprint a scanned image.

Now, the invention will be described in terms of a set of steps. With reference now to FIG. 9, initially, image signals representing mask values are obtained for a pixel of interest (X) and its adjacent neighbors A–H at step 202. At step 204, a set of S subpixels (in the described embodiment S=25 subpixels) corresponding to pixel X is identified. Based on the number of subpixels identified and the mask value of X, at step 206, a number p is derived, representing the number of subpixels that should be (totally) permeable in pixel X. At step 208, a fractional permeability value P for each subpixel is calculated, as a function of the position of the subpixel in the array of S values, the mask values for the neighboring pixels A–H, and the mask value of pixel X. Step 210 suggests that this function is preferably a linear interpolation process, which returns the values described at FIG. 6. Other functions that derive relative values of each subpixel based on surrounding pixels can be used.

At step 212, the subpixels are sorted by fractional permeability value P, so that at step 214, the subpixels with the largest fractional permeability values P can be identified. At step 216, if the subpixel is in the set of subpixels having the largest fractional permeability values P, then a flag is set for the subpixel indicating that it is "permeable". Otherwise the flag indicates that the subpixel is not permeable (step 220).

At this point, the foreground mask is available at high resolution. By collecting pixels expanded in this way, the high resolution mask can be found for any region of the object or for the entire object. The high resolution mask is then translated to the desired position with subpixel accuracy.

During the remainder of the process, the information about the subpixels, which is derived from what might be occurring at neighboring pixels, is used to determine shade and mask values for pixel X. With reference to FIG. 10, at step 320, the flag for each subpixel is reviewed to see if it is permeable. At step 322, if the flag is set to indicate permeability, the subpixel shade is set to the object shade. Otherwise, at step 324, the subpixel is set to either of the background shades, depending on whether it was assigned value MN or MX.

At step 326, the subpixel mask bitmap is translated by an integral subpixel amount. With reference to FIG. 11, as subpixels are translated away from the pixel boundary, subpixels from neighboring pixels are used to fill the gap. Processing does not take place on each pixel independently, but rather one must determine the subpixel expansions of masks for a several pixel neighborhood so that the realignment can cross pixel boundaries. The pixel for which the mask is expanded is different from the pixel for which the background is expanded. Reference is made to FIG. 11, which shows that as a mask pixel is translated, an area may be uncovered or no longer occupied, that then requires filling, perhaps with background. If pixel expansions are saved, it is a small matter to use such values to fill the uncovered area.

Returning to FIG. 10, at step 330, the subpixel mask value is averaged together. At step 332, the pixel mask is set to the average mask value determined at step 330. The process then begins again for the next pixel.

The gradations of grey at character edges change the apparent position of the edge at normal viewing conditions.

By carefully selecting the grey level of the pixel at an edge, the apparent position of the edge is made to move.

The disclosed method may be readily implemented in software using object oriented software development environments that provide portable source code that can be used on a variety of computer or workstation hardware platforms. Alternatively, the disclosed image processing system may be implemented partially or fully in hardware using standard logic circuits or specifically on a single chip using VLSI design. Whether software or hardware is used to implement the system varies depending on the speed and efficiency requirements of the system and also the particular function and the particular software or hardware systems and the particular microprocessor or microcomputer systems being utilized. The image processing system, however, can be readily developed by those skilled in the applicable arts without undue experimentation from the functional description provided herein together with a general knowledge of the computer arts.

While this invention has been described in conjunction with a preferred embodiment thereof, it is evident that many alternatives, modifications, and variations will be apparent to those skilled in the art. Accordingly, it is intended to embrace all such alternatives, modifications and variations as fall within the spirit and broad scope of the appended claims.

I claim:

1. A method for making small changes in edge position in continuous tone images combining an existing image A, a grey mask M and a shade value C for an object to be added to image A, including the steps of:
   1) providing an gray mask including pixels having contone values employing a number of gray levels G greater than 2;
   2) expanding gray mask M to a bitmap m defined in terms of subpixels;
   3) translating or moving m with respect to image A some number of subpixels to yield a translated mask m';
   4) finding pixels in A overlapped by m';
   5) expanding those pixels found in A to a bytemap of subpixels B;
   6) replacing any subpixels of the expanded pixels corresponding to ink in m' with said shade value C; and
   7) filtering those pixels in B and returning the filtered pixels to A.

2. The method of claim 1 where the plurality of subpixels for each pixel is a predetermined number N.

3. The method of claim 1 where step 2 includes:
   a) determining from the mask value for the pixel of interest a number p of subpixels that should be permeable;
   b) determining a fractional permeability value for each subpixel as a function of the mask value of the pixel of interest, the mask value of at least one neighboring pixel in the plurality thereof and the relative position of the subpixel in the pixel of interest to the at least one neighbor;
   c) sorting the determined fractional permeability values by magnitudes, and identifying those subpixels having the p largest magnitudes as permeable.

4. The method of claim 1 where the expanding in step 5 includes:
   a) determining for the pixel of interest and the plurality of neighboring pixels a minimum shade value and a maximum shade value;
   b) determining a shade value for each subpixel as a function of the shade value of the pixel of interest, the shade value of at least one neighbor and the relative position of the subpixel in the pixel of interest and the at least one neighbor;
   c) sorting the determined shade values by magnitude, assigning the maximum shade value to subpixels having the q largest shade values and assigning the minimum shade value to the remaining subpixels.

5. The method as defined in claim 3, wherein the plurality of neighbors includes 8 adjacent pixels.

6. The method as defined in claim 2, wherein the predetermined number of subpixels is about 25.

7. The method as defined in claim 3, wherein p is determined by the function:

$$p = {SM}/{N}$$

where M is the mask value of the pixel of interest, S is the number of subpixels and N is the value of a fully permeable pixel.

8. A method for making small changes in object edge position in continuous tone images combining an existing image A, a grey mask M and a color C for an object to be added to image A, including the steps of:
   1) providing an gray mask including pixels having contone values employing a number of gray levels G greater than 2;
   2) expanding gray mask M to a bitmap m;
   3) translating or moving m with respect to image A by some number of subpixels to obtain translated bitmap m';
   4) combining the values of translated bitmap m' to yield a new antialiased mask M' at the translated location;
   5) finding pixels in image A overlapped by new antialiased mask M';
   6) alpha blending the current color C with the existing image A using the new antialiased mask M' as an alpha factor to determine the new image.

9. The method of claim 8 where the plurality of subpixels for each pixel is a predetermined number N.

10. The method of claim 8 where step 2 includes:
    a) determining from the mask value for the pixel of interest a number p of subpixels that should be permeable;
    b) determining a fractional permeability value for each subpixel as a function of the mask value of the pixel of interest, the mask value of at least one neighboring pixel in the plurality thereof and the relative position of the subpixel in the pixel of interest from the at least one neighbor;
    c) sorting the determined fractional permeability values by magnitude, and identifying those subpixels having the p largest magnitudes as permeable.

11. The method of claim 8 where the combining of step 4 includes averaging the mask values of all the subpixels in the pixel of interest.

12. The method as defined in claim 10, wherein the plurality of neighbors includes 8 adjacent pixels.

13. The method as defined in claim 9, wherein the predetermined number of subpixels is about 25.

14. The method as defined in claim 10, wherein p is determined by the function:

$$p = {SM}/{N}$$

where M is the mask value of the pixel of interest, S is the number of subpixels and N is the value of a fully permeable pixel.

15. A method of translating antialiased edges expressed by an object mask with improved edge rendition, said edges including pixels and the method including:
1) providing an object mask including pixels having contone values employing a number of gray levels G greater than 2;
2) providing a high resolution version of the pixels of interest in the mask, including a plurality of subpixels;
3) assigning a binary mask value to each subpixel as a function of a position thereof within the pixel of interest and the values of any pixels neighboring the pixel of interest;
4) accumulating high resolution versions of pixels in the scope of the desired translation about the pixel of interest;
5) varying the mask values of the subpixels to translate the edge position within the pixel of interest;
6) combining the subpixel mask values in the pixel of interest to determine a final output value for the pixel of interest.

16. The method of claim 15 where step 2 includes receiving a plurality of neighboring pixels for each of the pixels of interest.

17. The method of claim 15 where the plurality of subpixels for each pixel is a predetermined number N.

18. The method of 17 where step 3 includes:

1) determining from the mask value for the pixel of interest a number p of subpixels that should be permeable;
2) determining a fractional permeability value for each subpixel as a function of the mask value of the pixel of interest, the mask value of at least one neighboring pixel in the plurality thereof and the relative position of the subpixel in the pixel of interest from the at least one neighbor;
3) sorting the determined fractional permeability values by magnitudes, and identifying those subpixels having the p largest magnitudes as permeable.

19. The method of claim 15 where the combining of step 6 includes averaging the mask values of all the subpixels in the pixel of interest.

20. The method as defined in claim 16, wherein the plurality of neighbors includes 8 adjacent pixels.

21. The method as defined in claim 17, wherein the predetermined number of subpixels is about 25.

22. The method as defined in claim 18, wherein p is determined by the function:

$$p = SM/N$$

where M is the mask value of the pixel of interest, S is the number of subpixels and N is the value of a fully permeable pixel.

* * * * *